(12) United States Patent
Faggella et al.

(10) Patent No.: US 9,640,926 B2
(45) Date of Patent: May 2, 2017

(54) INTERFACE DEVICE FOR THE CONNECTION AND THE PASSAGE OF AN ELECTRIC ROUTE THROUGH AN AIRTIGHT WALL OF AN AIRCRAFT

(71) Applicant: Airbus Operations SAS, Toulouse (FR)

(72) Inventors: Davide Faggella, Pelleport (FR);
Samson Lafranchis, Gimont (FR);
Philippe Chapoulie, Brax (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 15/223,101

(22) Filed: Jul. 29, 2016

(65) Prior Publication Data
US 2017/0040764 A1    Feb. 9, 2017

(30) Foreign Application Priority Data
Aug. 4, 2015 (FR) .................... 15 57528

(51) Int. Cl.
| | |
|---|---|
| *H01R 13/40* | (2006.01) |
| *H01R 25/00* | (2006.01) |
| *H01R 13/52* | (2006.01) |
| *H01R 43/00* | (2006.01) |
| *H01R 43/26* | (2006.01) |

(52) U.S. Cl.
CPC ......... *H01R 25/006* (2013.01); *H01R 13/521* (2013.01); *H01R 13/5202* (2013.01); *H01R 13/5205* (2013.01); *H01R 43/005* (2013.01); *H01R 43/26* (2013.01); *H01R 2201/26* (2013.01)

(58) Field of Classification Search
CPC .............. H01R 13/521; H01R 13/5219; H01R 13/5208; H01R 13/5213
USPC ..................... 439/589, 272, 587, 271, 588
See application file for complete search history.

(56) References Cited

U.S. PATENT DOCUMENTS

| | | | | |
|---|---|---|---|---|
| 3,537,062 | A | * 10/1970 | Niskin ................. | H01R 13/523 439/205 |
| 3,551,879 | A | * 12/1970 | Waller, Sr. ........... | H01R 13/639 439/369 |
| 5,197,903 | A | 3/1993 | Casey et al. | |
| 6,220,891 | B1 | * 4/2001 | Hils ................... | H01R 13/6598 439/284 |

(Continued)

FOREIGN PATENT DOCUMENTS

| | | |
|---|---|---|
| EP | 2361829 | 8/2011 |
| EP | 2546935 | 1/2013 |

OTHER PUBLICATIONS

French Search Report, Apr. 12, 2016, priority document.

*Primary Examiner* — Phuongchi T Nguyen
(74) *Attorney, Agent, or Firm* — Greer, Burns & Crain Ltd.

(57) ABSTRACT

An interface device that includes a plastic part including at least one through-opening in a longitudinal direction, the plastic part being adapted to be fixed in an airtight manner into an opening in the wall. At least one metal shaft is arranged and fixed in the through-opening. The metal shaft has a connection element at each longitudinal end. The metal shaft is configured to provide electric connectivity from one side of the wall to the other in a fixed position of the interface device. At least one fixing element is adapted to fix the plastic part to the wall.

10 Claims, 4 Drawing Sheets

(56) References Cited

U.S. PATENT DOCUMENTS

| | | | |
|---|---|---|---|
| 7,604,505 B2 * | 10/2009 | Zayas | H01J 5/54 439/236 |
| 2003/0032336 A1 | 2/2003 | Lazaro et al. | |
| 2008/0096421 A1 | 4/2008 | Hass | |
| 2011/0204184 A1 | 8/2011 | Blanchard et al. | |
| 2011/0278059 A1 | 11/2011 | Schewe | |
| 2013/0017720 A1 | 1/2013 | Maegawa | |

* cited by examiner

INTERFACE DEVICE FOR THE CONNECTION AND THE PASSAGE OF AN ELECTRIC ROUTE THROUGH AN AIRTIGHT WALL OF AN AIRCRAFT

CROSS-REFERENCES TO RELATED APPLICATIONS

This application claims the benefit of the French patent application No. 1557528 filed on Aug. 4, 2015, the entire disclosures of which are incorporated herein by way of reference.

BACKGROUND OF THE INVENTION

The present invention concerns an interface device for the connection and the passage of an electric route through an airtight wall of an aircraft.

The present invention notably applies to installing on an aircraft an electric route passing through an airtight wall (or bulkhead) separating a pressurized zone of the aircraft from an unpressurized zone.

More particularly, although not exclusively, it is applied to a "G-route" power route representing an electrical power supply between a variable frequency generator (VFG) and the EPDC (electrical power distribution center) in the fuselage (for distribution of the electrical power supply to the equipment in the aircraft).

To this end, there is generally provided a first or "VP" system that enables the electric cables to pass through an airtight wall (or structure) separating a first zone (for example a pressurized one) from a second zone (for example an unpressurized one) of the aircraft, in particular, a structure between the center section of the fuselage and the wings of the aircraft. Moreover, there is also provided in this case a second or "VT" system enabling interconnection of the electric cables.

With two systems of this type, each part (or section) of the aircraft is shipped separately with the cables already pre-installed and the cables are then interconnected during the final assembly of the sections of the aircraft.

This usual solution comprising two separate systems, namely a first system for providing the mechanical passage function between the first zone (for example, the pressurized zone) and the second zone (for example, the unpressurized zone) and a second system for providing the electrical connection function, has disadvantages in terms of weight, cost and difficult assembly in particular.

This solution is therefore not the optimum.

SUMMARY OF THE INVENTION

The present invention aims to remedy this disadvantage. It concerns an interface device for the connection and the passage of an electric route through an airtight wall of an aircraft.

In accordance with the invention, the interface device includes:
- a plastic part including at least one through-opening in a longitudinal direction, the plastic part being adapted to be fixed in an airtight manner into an opening in the wall;
- at least one metal shaft arranged and fixed in said through-opening, said metal shaft having a connection element at each longitudinal end, said metal shaft being intended to provide electric connectivity from one side of the wall to the other in a fixed position of the interface device; and
- at least one fixing element adapted to fix the plastic part to the wall.

In a preferred embodiment, the plastic part includes a plurality of through-openings in the longitudinal direction and the interface device includes a plurality of metal shafts, each of said metal shafts being arranged in one of said through-openings.

Thanks to the invention, the interface device, which notably includes a plastic part for the passage of an electric route through an airtight wall of an aircraft, therefore also includes means (including a metal shaft or preferably a plurality of metal shafts) to provide an electrical connection from one side of the airtight wall to the other.

Therefore, the interface device incorporates means for simultaneously implementing a function of passing through the airtight wall and a function of electrically connecting the cables.

This makes it possible to achieve savings in weight and cost and easy assembly and fitting, and therefore to remedy the aforementioned disadvantage.

The plastic part advantageously includes longitudinally on one of its sides partitions arranged in the longitudinal direction and configured to create a plurality of delimited zones, each of said delimited zones being formed around a through-opening.

Moreover, the interface device advantageously further includes an auxiliary plastic part, the auxiliary plastic part being fixed in the longitudinal direction to the plastic part and being configured to create a plurality of delimited auxiliary zones, each of said delimited auxiliary zones being defined around a through-opening.

Each metal shaft preferably includes longitudinally, for fixing it to the plastic part:
- on one side, an annular rim serving as an abutment on a first side of the plastic part; and
- on the other side, a screw thread intended to receive a nut provided on a second side of the plastic part.

Moreover, the interface device advantageously includes for each metal shaft a seal arranged between the abutment and the plastic part.

Also, the fixing element advantageously includes a nut intended to fix the interface device to the wall and the interface device further includes a seal intended to be mounted between the plastic part and the wall in the fixed position of the interface device.

Additionally, in a first preferred variant embodiment, the plastic part moreover includes at least one auxiliary through-opening in the longitudinal direction, the auxiliary through-opening being intended to receive an excitation cable.

In this case, the interface device advantageously includes a cable gland configured to provide a seal around the excitation cable in the auxiliary through-opening.

Additionally, in a second variant embodiment, the plastic part moreover includes at least one connection assembly for an excitation cable.

The present invention also concerns a structural element of an aircraft, that structural element including at least a part of an airtight wall of the aircraft.

In accordance with the invention, said structural element further includes at least one interface device as cited above.

The present invention moreover concerns a method of mounting an interface device as described above on an airtight wall. That mounting method includes the following steps:

a step comprising assembling the interface device by fixing the metal shafts to the plastic part and mounting the auxiliary plastic protection on the plastic part;

a step comprising connecting electric cables on a first side of the interface device and installing an excitation cable on the interface device;

a step comprising fixing the interface device and the elements that it comprises to the airtight wall; and a step comprising connecting electric cables on a second side of the interface device.

BRIEF DESCRIPTION OF THE DRAWINGS

The appended figures explain clearly how the invention may be reduced to practice. In those figures, identical references designate similar elements.

DETAILED DESCRIPTION OF THE PREFERRED EMBODIMENTS

Figure 1:
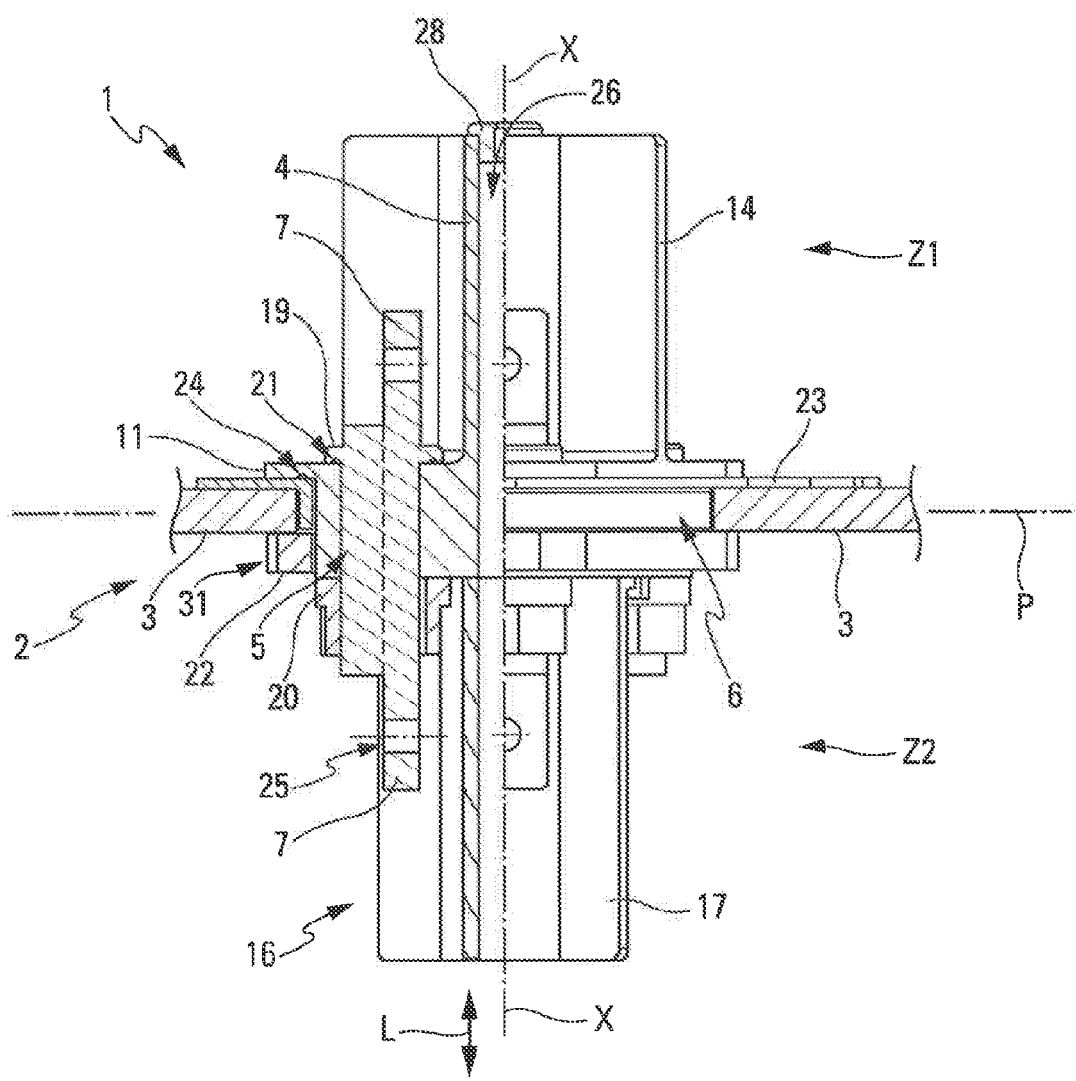
FIG. 1 is a view, partly in longitudinal section, of an interface device in a mounting position (or fixed position).

The interface device 1 represented diagrammatically in section in FIG. 1 and serving to illustrate the invention is intended to provide a connection and the passage of an electric route through a structural element 2 including at least a part of an airtight wall (or bulkhead) 3 of an aircraft (not shown).

More particularly, although not exclusively, this airtight wall 3 separates a pressurized zone Z1 of the aircraft from an unpressurized zone Z2.

The interface device 1 has a longitudinal axis X-X (defining a longitudinal direction L) that is an axis of symmetry (circular symmetry) for most of the components of the interface device 1.

In the FIG. 1 fixed position (or mounting position), the interface device 1 is mounted on the airtight wall 3 so that the longitudinal axis X-X is substantially orthogonal to a medium plane P of the airtight wall 3 at least in the vicinity of the mounting zone.

Figure 2:
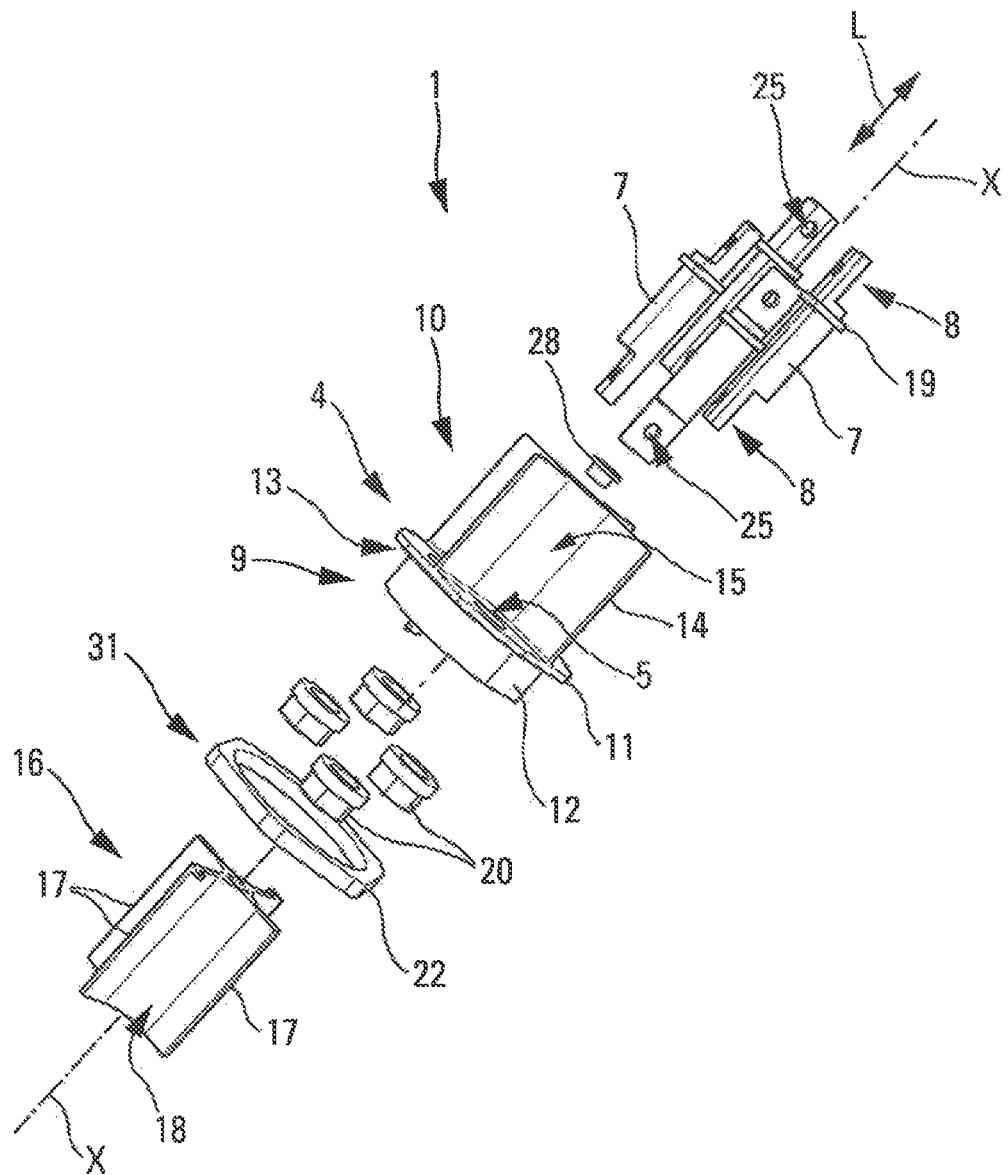
FIG. 2 is an exploded perspective view of various components of an interface device.

In accordance with the invention, the interface device 1 includes, as shown in FIGS. 1 and 2:
  a plastic part 4 including at least one through-opening 5 in the longitudinal direction L, the plastic part 4 being configured to be fixed in an airtight manner into an opening 6 in the wall 3 (FIG. 1);
  at least one metal shaft 7 arranged and fixed in said through-opening 5, said metal shaft 7 having a connection element 8 (FIG. 2) at each longitudinal end, said (electrically conductive) metal shaft 7 being intended to provide electric connectivity from one side to the other (Z1, Z2) of the wall 3 in the fixed position (or mounting position) of the interface device 1 (FIG. 1); and
  at least one fixing element 31 adapted to fix the plastic part 4 to the wall 3.

In the preferred embodiment shown in the figures:
  the plastic part 4 includes a plurality of through-openings 5 in the longitudinal direction L; and
  the interface device 1 includes a plurality of metal shafts 7, each of the through-opening 5 being intended to receive a metal shaft 7 in the mounting position.

The plastic part 4 preferably includes a plurality of through-openings 5, for example four of them as shown in the figures, that are uniformly distributed around the longitudinal axis X-X.

The number of metal elements corresponds to the number of electric cables, or of bundles of cables or electric wires, that are to be connected via the interface device 1.

Figure 3A:
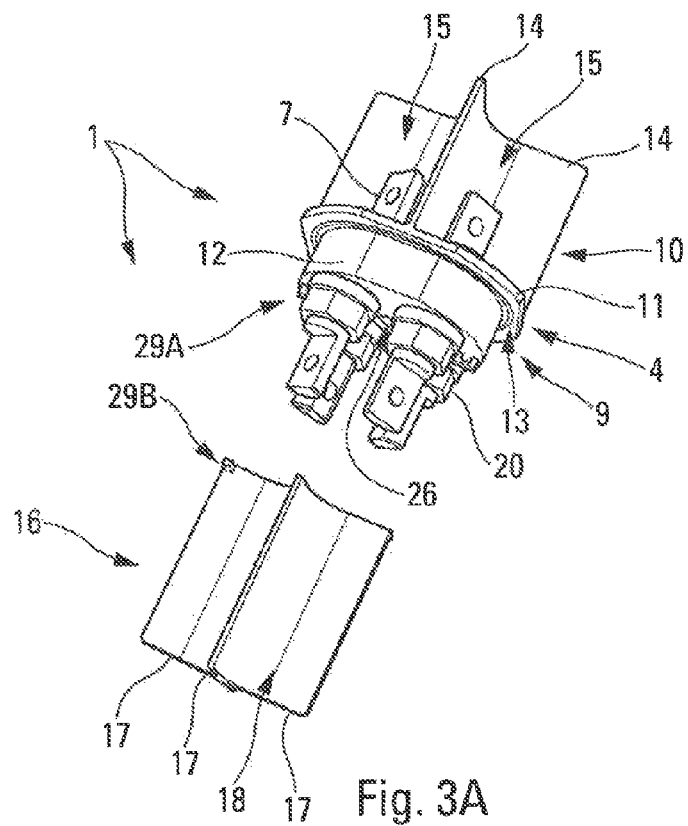
FIGS. 3A to 3D show in perspective view various successive steps of mounting the interface device from FIG. 2 on an airtight wall.

Moreover, as shown in FIGS. 2 and 3A in particular, the plastic part 4 includes two parts 9 and 10 separated by a thin intermediate disc 11. One part 9 includes a solid disc 12 (solid except for the openings 5 that the intermediate disc 11 also includes). The periphery of this disc 12 fits the opening 6 (FIG. 1) in the wall 3 so as to be able to penetrate with contact into said opening 6.

The intermediate disk 11 has a greater diameter than the disc 12 so as to create a peripheral rim 13 serving to support the plastic part 4 on the wall 3 in the mounting position.

Moreover, the part 10 includes, longitudinally, a set of partitions 14 that are arranged in the longitudinal direction L and are configured to create a plurality of delimited zones 15 between them. Each of said delimited zones 15 is formed around a through-opening 5.

The plastic part 4 therefore has a two-fold function:
  to enable positioning of the interface device 1 in the opening 6 in the wall 3 (via the disc 12); and
  to prevent the generation (in the zone Z1) of electric arcs between the metal shafts 7 (mounted in the through-openings 5) by separating them from one another by means of the partitions 14 (which are of (electrically insulative) plastic material like the whole of the plastic part 4).

The interface device 1 further includes an auxiliary plastic part 16. This auxiliary plastic part 16 is fixed to the plastic part 4 in the longitudinal direction L. The auxiliary plastic part 16 includes, longitudinally, a set of partitions 17 that are arranged in the longitudinal direction L and are configured to create a plurality of delimited zones 18 between them. Each of said delimited zones 18 is formed around a through-opening 5 (FIG. 1) when the auxiliary plastic part 16 is fixed to the plastic part 4.

This auxiliary plastic part 16 therefore makes it possible to prevent the generation (in the zone Z2) of electric arcs between the metal shafts 7 (mounted in the through-openings 5) by separating them from one another by means of the partitions 17 (which are of electrically insulative plastic material).

This auxiliary plastic part 16 is preferably made in a similar way to the portion 10 of the plastic part 4.

Each metal shaft 7 includes longitudinally (in the direction L), for fixing it to the plastic part 4:
  on one side, an annular rim 19 serving as an abutment on a first side of the plastic part 4; and
  on the other side, a screw thread (not shown) intended to receive a nut 20, for example conforming to the "ASNA2531" standard, provided on the second side of the plastic part 4.

Moreover, the connection elements 8 at the two longitudinal ends of each metal shaft 7 include, for example, a hole 25 forming a terminal (FIG. 2).

The interface device 1 also includes, for each metal shaft 7, a seal 21 (shown in FIG. 1) that is arranged between the abutment 19 and the plastic part 4.

Moreover, the fixing element 31 includes a nut 22 intended to fix the interface device 1 to the wall 3. For this fixing, a counter-plate 23 is provided serving as an interface element between the annular disc 11 of the plastic part 4 and the wall 3, as shown in FIG. 1.

The interface device 1 further includes a seal 24 intended to be mounted between the annular disc 11 of the plastic part 4 and the counter-plate 23 in the fixed position of the interface device 1, as shown in FIG. 1.

The O-ring seals 21 and 24 contribute to sealing the interface device 1 when it is mounted on the airtight wall 3.

Moreover, in a preferred embodiment, as can be seen in FIG. 3A in particular, the plastic part 4 includes at least one auxiliary through-opening 26.

In the example shown in the figures, the auxiliary through-opening 26 is at the center of the plastic part 4 along the longitudinal axis X-X.

Figure 3B:
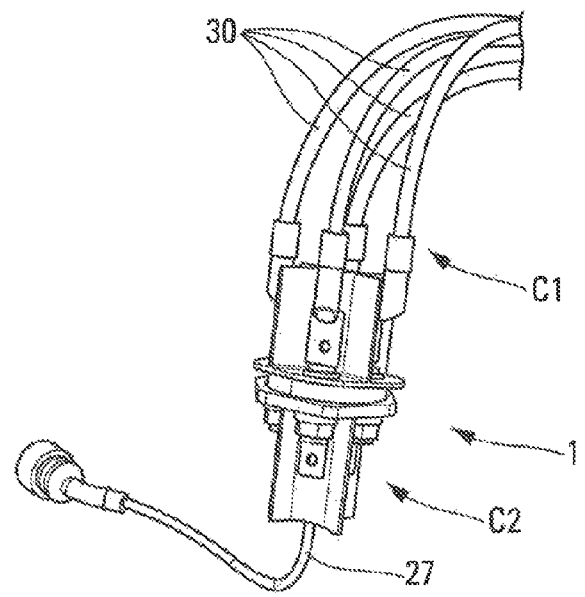
Figure 3C:
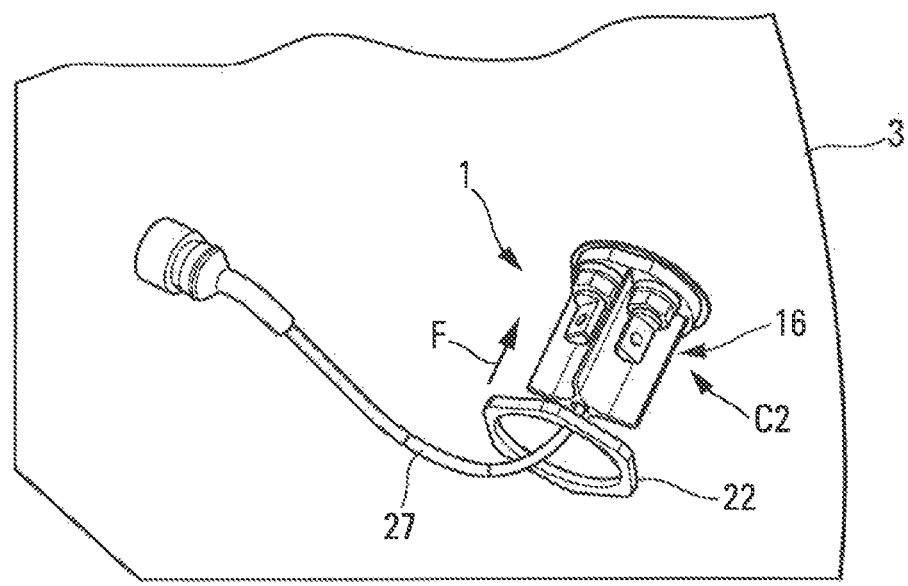
Figure 3D:
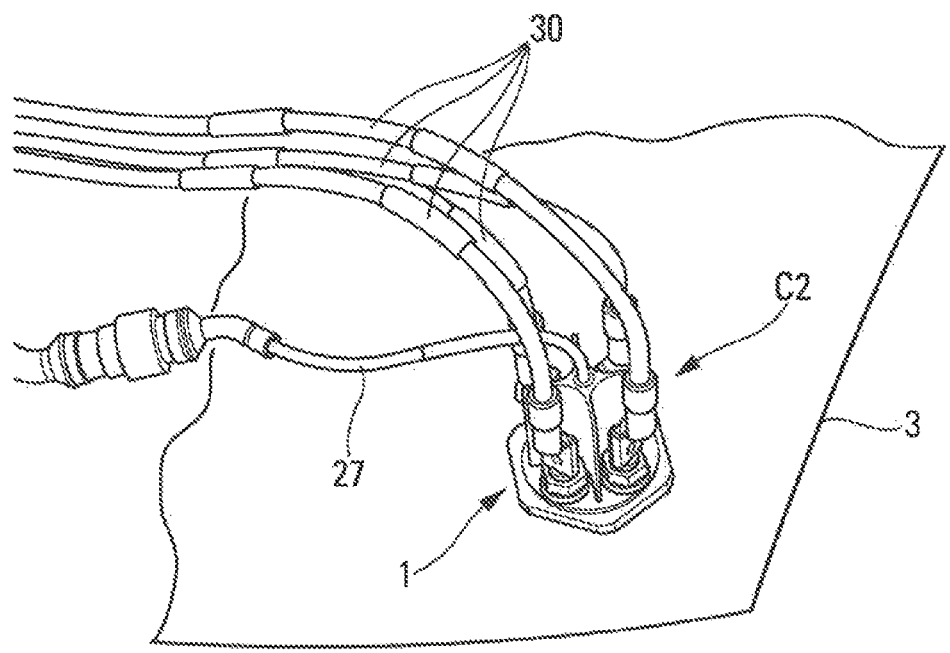

This auxiliary through-opening 26 is adapted to receive an excitation cable 27 (FIGS. 3B to 3D) intended to form a standard "E-route" electrical route. In particular, in the aforementioned preferred application this excitation cable 27 is intended for controlling the "VFG" generator. The excitation cable 27 passes through the interface device 1 and is connected to another excitation cable via connectors located outside the interface device 1.

The interface device 1 further includes a cable gland 28 configured to produce a seal around the excitation cable 27 at the level of the auxiliary through-opening 26 (FIGS. 1 and 2).

Moreover, in a variant embodiment (not shown), the excitation cable is connected to the interface device instead of passing through it, as in the aforementioned preferred embodiment. To this end, the plastic part is provided with a connection assembly for an excitation cable.

That connection assembly preferably includes a metal shaft and associated elements similar to those relating to one of the metal shafts 7.

A method of mounting an interface device 1 as described above on an airtight wall 3 is described below.

This assembly method includes the following successive steps EA to ED shown in FIGS. 3A to 3D, respectively:
  a step EA (FIG. 3A) comprising assembling the interface device 1;
  by fixing the metal shafts 7 to the plastic part 4 using the nuts 20; and
  by mounting the auxiliary plastic part 16 on the plastic part 4 and fixing it with the aid of cooperating fixing elements 29A and 29B, for example;
  a step EB (FIG. 3B) comprising connecting electric cables 30 on a first side C1 of the interface device 1 and installing an excitation cable 27 on the interface device 1;
  a step EC (FIG. 3C) comprising fixing the interface device 1 and the elements that it comprises to the airtight wall 3 by means of the nut 22 mounted on the other side C2 as indicated by an arrow F; and
  a step ED (FIG. 3D) comprising connecting the electric cables 30 on the side C2 of the interface device 1.

The excitation cable 27 is also connected on both sides of the wall 3.

The interface device 1 as described above therefore has the following advantages in particular:
  a saving in weight;
  a saving in cost;
  a saving in installation time on an aircraft final assembly line;
  easier maintenance; and
  an improved seal (or impermeability).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An interface device for the connection and the passage of an electric route through an airtight wall of an aircraft, the interface device comprising:
  a plastic part including at least one through-opening in a longitudinal direction, the plastic part being adapted to be fixed in an airtight manner into an opening in the wall;
  at least one metal shaft arranged and fixed in said through-opening, said metal shaft having a connection element at each longitudinal end, said metal shaft being configured to provide electric connectivity from one side of the wall to the other in a fixed position of the interface device;
  at least one fixing element adapted to fix the plastic part to the wall;
  the plastic part comprising a plurality of through-openings in the longitudinal direction and the interface device including a plurality of metal shafts, each of said metal shafts being arranged in one of said through-openings, and
  the plastic part comprising longitudinally on one of its sides partitions arranged in the longitudinal direction and configured to create a plurality of delimited zones, each of said delimited zones being formed around a through-opening.

2. The interface device according to claim 1, further including an auxiliary plastic part, the auxiliary plastic part being fixed in the longitudinal direction to the plastic part and being configured to create a plurality of delimited auxiliary zones, each of said delimited auxiliary zones being defined around a through-opening of the plastic part.

3. Interface device according to claim 1, wherein the fixing element includes a nut configured to fix the interface device to the wall and wherein the interface device further includes a seal configured to be mounted between the plastic part and the wall in the fixed position of the interface device.

4. The interface according to claim 1, wherein the plastic part further includes at least one connection assembly for an excitation cable.

5. An aircraft structural element, the structural element including at least part of an airtight wall of the aircraft and including at least one interface device according to claim 1.

6. A method for mounting an interface device according to any one of claim 1 on an airtight wall, comprising the following steps:
  assembling the interface device by fixing the metal shafts to the plastic part and mounting the auxiliary plastic protection on the plastic part;
  connecting electric cables on a first side of the interface device and installing an excitation cable on the interface device;
  fixing the interface device and the elements that comprise the interface device to the airtight wall; and connecting electric cables on a second side of the interface device.

7. Interface device according to claim 1, wherein each metal shaft includes longitudinally, for fixing it to the plastic part:
   on one side, an annular rim serving as an abutment on a first side of the plastic part; and
   on the other side, a screw thread configured to receive a nut provided on a second side of the plastic part.

8. The interface device according to claim 7, further including, for each metal shaft, a seal arranged between the abutment and the plastic part.

9. The interface device according to claim 1, wherein the plastic part further includes at least one auxiliary through-opening in the longitudinal direction, the auxiliary through-opening being configured to receive an excitation cable.

10. The interface device according to claim 9, further including a cable gland configured to provide a seal around the excitation cable in the auxiliary through-opening.

\* \* \* \* \*